(12) United States Patent
Wierzbicki et al.

(10) Patent No.: US 7,339,674 B2
(45) Date of Patent: *Mar. 4, 2008

(54) APPARATUS AND METHOD FOR CHANGING THE COLOR OF A FLOW OF FLUID

(75) Inventors: Daniel S. Wierzbicki, University Heights, OH (US); James C. M. Manter, Broadview Heights, OH (US)

(73) Assignee: The Sherwin-Williams Company, Cleveland, OH (US)

( * ) Notice: Subject to any disclaimer, the term of this patent is extended or adjusted under 35 U.S.C. 154(b) by 113 days.

This patent is subject to a terminal disclaimer.

(21) Appl. No.: 10/792,953

(22) Filed: Mar. 4, 2004

(65) Prior Publication Data

US 2004/0187776 A1  Sep. 30, 2004

Related U.S. Application Data (60) Provisional application No. 60/453,281, filed on Mar. 7, 2003.

(51) Int. Cl.
   *G01J 3/51* (2006.01)
   *B01F 15/04* (2006.01)

(52) U.S. Cl. .............. 356/410; 356/425; 366/140; 366/142; 366/143

(58) Field of Classification Search .......... 356/402, 356/410, 425; 366/140, 142, 143
See application file for complete search history.

(56) References Cited

U.S. PATENT DOCUMENTS

| | | | |
|---|---|---|---|
| 3,773,424 A | 11/1973 | Selgin | 356/181 |
| 4,278,887 A | 7/1981 | Lipshutz et al. | 250/432 |
| 4,403,866 A | 9/1983 | Falcoff et al. | 366/132 |
| 4,822,166 A | 4/1989 | Rossiter | 356/246 |
| 4,887,217 A | 12/1989 | Sherman et al. | 364/468 |
| 5,120,129 A | 6/1992 | Farquharson et al. | 356/246 |
| 5,140,169 A | 8/1992 | Evens et al. | 250/576 |
| 6,010,032 A | 1/2000 | Vermylen et al. | 222/1 |
| 6,288,783 B1 | 9/2001 | Auad | 356/410 |
| 2002/0167663 A1 | 11/2002 | Martino et al. | 356/319 |
| 2003/0004229 A1 | 1/2003 | Schermacher et al. | 523/303 |

OTHER PUBLICATIONS

International Search Report for PCT/US2004/006581, 3 pages PCT Written Opinion dated Oct. 13, 2004, International Application No. PCT/US2004/006581, International Filing Date Mar. 4, 2004, corresponding to U.S. Appl. No. 10/792,953.

*Primary Examiner*—F. L. Evans
(74) *Attorney, Agent, or Firm*—Vivien Y. Tsang; Robert E. McDonald; Paul R. Katterle (57) ABSTRACT

A color adjustment system for changing the color of fluid flowing from a source. The color adjustment system includes a main mixing pipe connected to storage vessels to continuously receive flows of colorants from the storage vessels. A fluid inspection cell is connected to the main mixing pipe for continuously receiving a sample portion of the flow of the fluid composition. A spectrophotometer is positioned to view the sample portion of the flow of the fluid composition through a window of the fluid inspection cell. The spectrophotometer transmits measured color values to a control unit, which generates control signals in response thereto. The control signals are transmitted to colorant pumps, which pump colorants to the main mixing pipe in response to the control signals.

7 Claims, 7 Drawing Sheets

APPARATUS AND METHOD FOR CHANGING THE COLOR OF A FLOW OF FLUID

CROSS-REFERENCE TO RELATED APPLICATION

This application claims the benefit of U.S. provisional patent application No. 60/453,281 filed on Mar. 7, 2003, the entirety of which is hereby incorporated by reference.

BACKGROUND OF THE INVENTION

The present invention is directed to apparatus and methods for changing the color of a fluid such as paint and more specifically to apparatus and methods for changing the color of a flow of fluid, such as paint.

Conventionally, water-borne paint is produced in a batch process. In a typical batch process, such as that disclosed in U.S. Pat. No. 4,403,866 to Falcoff et al. (which is hereby incorporated by reference), paint components are metered into a large mixing vessel where they are mixed together by a mechanical mixer with a rotating blade or impeller. A formula for the paint determines the initial amounts of colorants, binder and other paint components that are added to the mixing vessel. Due to variations in the properties of the colorants and other paint components, the color of the paint produced from the initial components may not be within a certain color tolerance value as determined by ΔE. Accordingly, a small sample of the paint is removed from the mixing vessel and its color is measured with a spectrophotometer. If the color of the paint is not within the color tolerance value, additional amounts of colorants are added to the paint in the mixing vessel. This cycle of sampling, analysis and addition is repeated until the color of the paint is within the color tolerance value. Once this occurs, the process is complete and the paint is pumped from the mixing vessel to a holding tank or a filling station. With this type of batch process, the color of the entire batch of the paint is adjusted only by adding colorants to the mixing vessel.

Recently, it has been proposed to produce colored coatings in a continuous process. For example, U.S. Pat. No. 6,010,032 to Vermylen et al. (which is hereby incorporated by reference) discloses a method and apparatus for continuously producing a colored coating, such as a paste, for use in the continuous production of a coated, dyed, printed, or painted material, such as carpeting. The method and apparatus of the Vermylen et al. patent, however, does not have a system for monitoring and adjusting the color of the colored coating during its production.

Based on the foregoing, there is a need in the art for a method and apparatus for adjusting the color of a flow of fluid, such as paint. The present invention is directed to such a method and apparatus.

SUMMARY OF THE INVENTION

In accordance with the present invention, a color adjustment system for changing the color of fluid, such as paint, flowing from a source is provided. The color adjustment system includes a main mixing pipe connected to storage vessels to continuously receive flows of compositions (including at least one colorant) from the storage vessels. The flows of the compositions are mixed together in the main mixing pipe to form a continuous flow of different colored fluid. A fluid inspection cell is connected to the main mixing pipe for continuously receiving a sample portion of the flow of the different colored fluid. A spectrophotometer is positioned to view the sample portion through a window of the fluid inspection cell. A control unit is electrically connected to the spectrophotometer to receive electrical signals generated by the spectrophotometer. The control unit is operable to perform a comparison of the measured color values to desired color values and to produce electrical control signals dependent on the comparison. At least one colorant pump is electrically connected to the control unit to receive the electrical control signals. The at least one colorant pump is connected to at least one of the storage vessels and is operable to pump the at least one colorant to the main mixing pipe in response to the control signals.

BRIEF DESCRIPTION OF THE DRAWINGS

The features, aspects, and advantages of the present invention will become better understood with regard to the following description, appended claims, and accompanying drawings where:

DETAILED ESCRIPTION OF THE PREFERRED EMBODIMENTS

It should be noted that in the detailed description that follows, identical components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

One of the components of the present invention relates to the measurement of color. Briefly, color is a sensation evoked by the physical stimulation of color photoreceptor cone cells in the human retina. The stimulation consists of electromagnetic radiation in the visible spectrum comprising wavelengths between 380 and 780 nm. The photoreceptor cone cells can be separated into three classes, with each class being sensitive to a different spectral distribution of radiation. This trichromacy of color sensation permits the color of an object to be described by three numerical components, such as the tristimulus values X, Y and Z, which are based on the tristimulus responses x, y, and z of a standard observer that were developed through experimentation by the Commission Internationale de L'Éclairage (CIE) in 1931. More specifically, the tristimulus values X, Y and Z are the integrals of the products of the functions x, y and z with the radiant energy distribution functions from the object.

Figure 1:
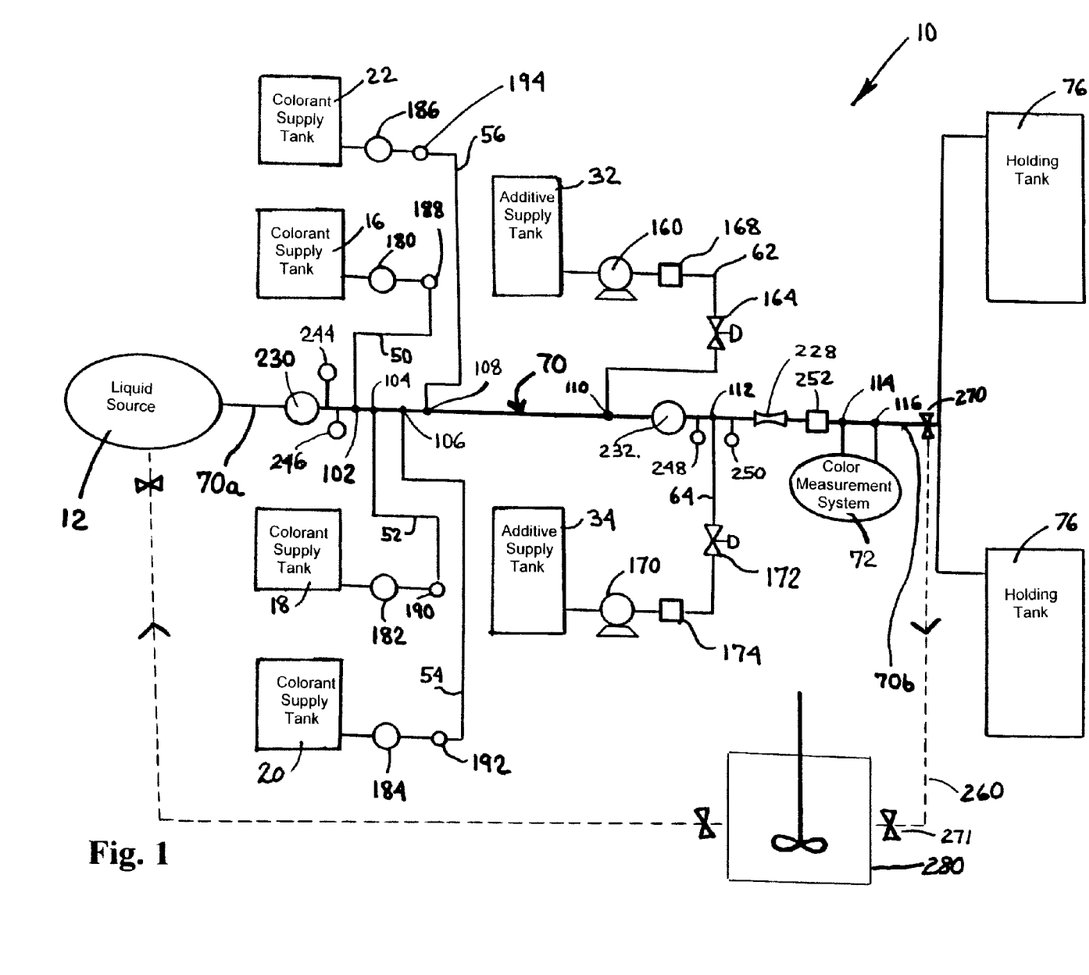
FIG. 1 shows a schematic view of a color adjustment system embodied in accordance with the present invention.

Referring now to FIG. 1, the present invention is directed to a color adjustment system 10 for adjusting (shading) or tinting a source fluid flowing from a source 12, such as a continuous paint production unit or one or more batch mixing vessels. The color adjustment system 10 can generally comprise, for example, a plurality of colorant supply tanks 16, 18, 20, 22, progressing cavity pumps 180, 182, 184, 186, a plurality of additive supply tanks 32, 34, a main mixing pipe 70, a color measurement system 72, a controller 74 (shown in FIG. 2) and a plurality of holding tanks 76 for holding the fluid that has been shaded.

The additive supply tank 32 holds a thickener for increasing the viscosity of the fluid flowing through the main mixing pipe 70. The thickener can be an associative thickener, such as a polyurethane thickener. A pump 160 is connected to an outlet of the additive supply tank 32 and is operable to pump the thickener from the additive supply tank 32 through an additive supply conduit 62 to the main mixing pipe 70. A flow control valve 164 is connected into the additive supply conduit 62 and is operable to control the flow of the thickener into the main mixing pipe 70. The flow control valve 164 is electrically connected to the controller 74 by wiring (not shown). Upstream of the flow control valve 164, a mass flow meter 168 is connected into the additive supply conduit 62 to provide a measure of the flow of the thickener into the main mixing pipe 70. The mass flow meter 168 is electrically connected to the controller 74 by wiring (not shown).

The additive supply tank 34 holds a defoamer for reducing foam in the fluid flowing through the main mixing pipe 70. The defoamer may be a petroleum hydrocarbon, a long chain saturated alcohol, or an emulsion of a silicone polymer. A pump 170 is connected to an outlet of the additive supply tank 34 and is operable to pump the defoamer from the additive supply tank 34 through an additive supply conduit 64 to the main mixing pipe 70. A flow control valve 172 is connected into the additive supply conduit 64 and is operable to control the flow of defoamer into the main mixing pipe 70. The flow control valve 172 is electrically connected to the controller 74 by wiring (not shown). Upstream of the flow control valve 172, a mass flow meter 174 is connected into the supply conduit 64 to provide a measure of the flow of the defoamer into the main mixing pipe 70. The mass flow meter 174 is electrically connected to the controller 74 by wiring (not shown).

The colorant supply tanks 16-22 hold different colorants. For example, the colorant supply tank 16 may hold a blue colorant, the colorant supply tank 18 may hold a black colorant, the colorant supply tank 20 may hold a yellow colorant, and the colorant supply tank 22 may hold a red colorant. Each colorant comprises solid particles of pigment dispersed in a dispersant system, such as a mixture of water and ethylene glycol. Each of the colorant supply tanks 16-22 includes a mixer (not shown) for agitating the colorant to prevent the pigment from settling. The colorant supply tanks 16-22 are connected to the main mixing pipe 70 by colorant supply conduits 50, 52, 54, 56, respectively. Progressing cavity pumps 180, 182, 184 and 186 are respectively connected into the colorant supply conduits 50-56. The progressing cavity pumps 180-186 are operable to accurately pump metered amounts of the colorants from the colorant supply tanks 16-22 through the colorant supply conduits 50-56 to the main mixing pipe 70. An example of a commercially available progressing cavity pump that may be used is a Group D dosing pump available from Seepex, Inc., having a place of business at 511 Speedway Drive, Enon, Ohio 45323. The progressing cavity pumps 180-186 are electrically connected to the controller 74 by wiring (not shown). Downstream of the progressing cavity pumps 180-186, flow transmitters 188, 190, 192, 194 are respectively connected into the colorant supply conduits 50-56 to provide measures of the flows of the colorants into the main mixing pipe 70. The flow transmitters 188-194 are electrically connected to the controller 74 by wiring (not shown).

The main mixing pipe 70 is connected to the source 12 to receive the source fluid therefrom. The main mixing pipe 70 can have a diameter of about four inches (4"). The pipe 70 has an inlet portion 70a and an outlet portion 70b. The inlet portion 70a includes a plurality of inlets, which are staggered along the axis of the main mixing pipe 70 so as to obtain sequenced mixing of the colorants, thickener and defoamer as they flow through the main mixing pipe 70. In the order of location along the main mixing pipe 70, starting at the source 12, the inlet 102 is connected to the colorant supply conduit 50 for the blue colorant, the inlet 104 is connected to the colorant supply conduit 52 for the black colorant, the inlet 106 is connected to the colorant supply conduit 54 for the yellow colorant, the inlet 108 is connected to the colorant supply conduit 56 for the red colorant, the inlet 110 is connected to the additive supply conduit 62 for the thickener, and the inlet 112 is connected to the additive supply conduit 64 for the defoamer.

A first dynamic mixer 230 can be connected into the main mixing pipe 70 between the source 12 and the inlet 102 for the colorant supply conduit 50 for the blue colorant. A second dynamic mixer 232 is connected into the main mixing pipe 70 between the inlet 110 for the additive supply conduit 62 for the thickener and the inlet 112 for the additive supply conduit 64 for the defoamer. An in-line mixer 228 is connected into the main mixing pipe 70 between the inlet 112 for the additive supply conduit 64 for the defoamer and a first sample connection 114 connected to the color measurement system 72.

The in-line mixer 228 is a conventional static mixer, i.e., a mixer with no moving parts. Conventional static mixers operate by dividing a fluid stream into a plurality of substreams and then recombining the substreams into a main stream. The fluid stream may divided for example by one or more helical elements, a series of curved elements, a plurality of offset planar elements, one or more perforated plates, or a combination of the foregoing. The dividing elements are secured from movement within the main mixing pipe 70.

The first and second dynamic mixers 230, 232 can be conventional power-driven mixers having a moving mixing element or impeller. Various types of impellers may be used, including helix, propeller, turbine, gate, anchor and paddle impellers. The first and second dynamic mixers 230, 232 are electrically connected to the controller 74 by wiring (not shown).

In addition to the in-line mixer 228 and the first and second dynamic mixers 230, 232, a plurality of measurement devices are connected to the main mixing pipe 70 for measuring various properties of the fluid as it flows through the main mixing pipe 70. For example, a first viscosity measurement and transmitting device 244 is connected to the main mixing pipe 70 between the first dynamic mixer 230 and the inlet 102 for the colorant supply conduit 50 for the blue colorant. A first pressure measurement and transmitting device 246 is connected to the main mixing pipe 70 between the first viscosity measurement and transmitting device 244 and the inlet 102 for the colorant supply conduit 50 for the blue colorant. A second viscosity measurement and transmitting device 248 is connected to the main mixing pipe 70 between the second dynamic mixer 232 and the inlet 112 for the additive supply conduit 64 for the defoamer. A second pressure measurement and transmitting device 250 is connected to the main mixing pipe 70 between the inlet 112 for the additive supply conduit 64 for the defoamer and the in-line mixer 228. A mass flow meter 252 is connected into the main mixing pipe 70 between the in-line mixer 228 and the first sample connection 114. The first and second pressure measurement devices 246, 250, the first and second viscosity measurement devices 244, 248, and the mass flow meter 252 are electrically connected to the controller 74 by wiring (not shown).

The controller 74 stores or is programmed to receive mass flow formulas for a plurality or library of different chromatic fluids. If the source 12 is a batch mixing vessel, each mass flow formula specifies the flow rate of the source fluid as well as the flow rates of the colorants. If the source 12 is a continuous paint production unit, the controller 74 can be used to control the flows of the components of the source paint, such as the binder(s) and grind paste, in which case, each mass flow formula specifies the flow rates of the components of the source paint as well as the flow rates of the colorants. For each mass flow formula, the corresponding chromatic paint is manufactured and run through the color measurement system 72 to obtain a "wet" color standard. The controller 74 stores or is programmed to receive the color standards for the library of chromatic paints.

Figure 2:
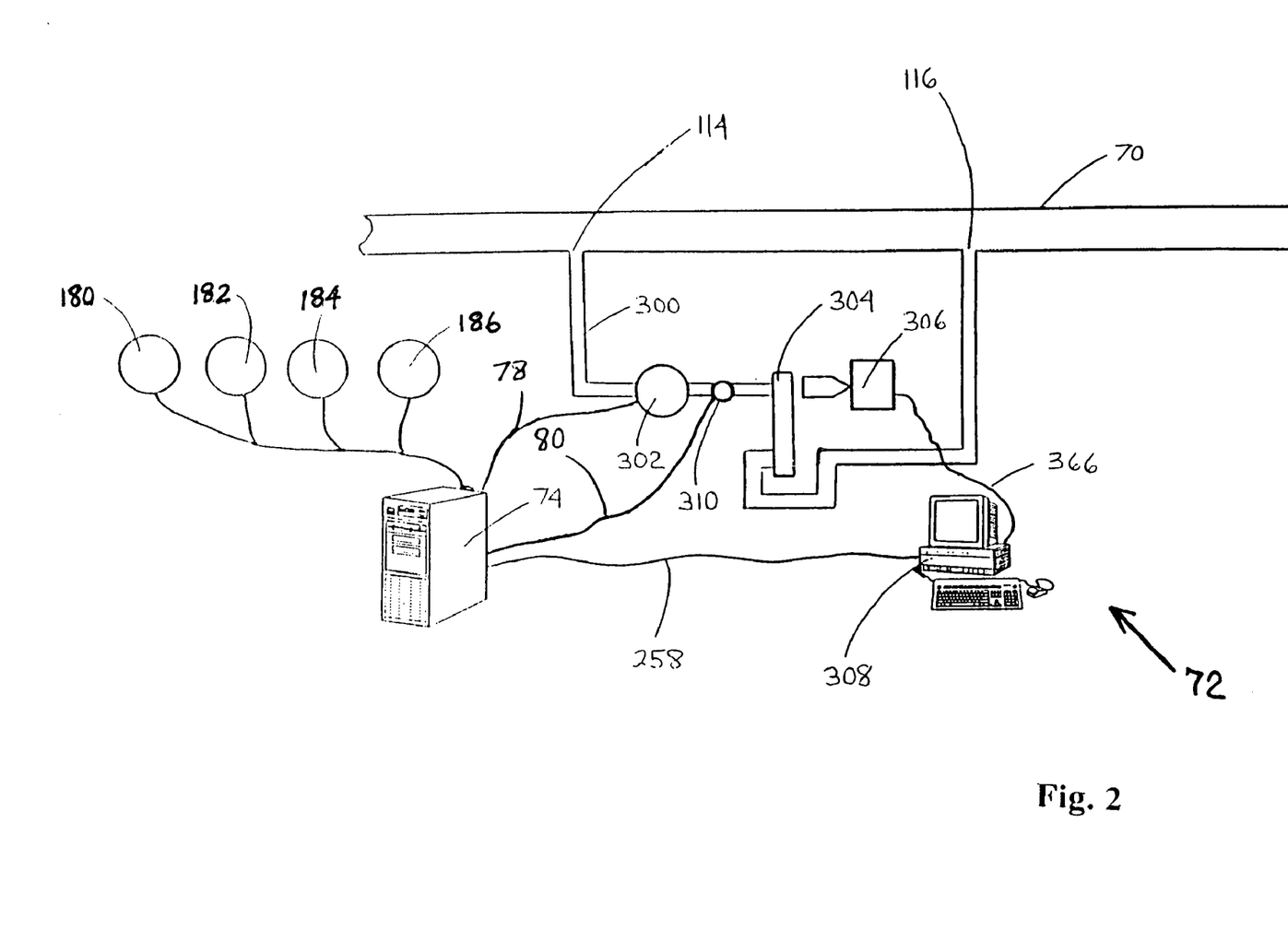
FIG. 2 shows a schematic view of a color measurement system of the color adjustment system.

Once a mass flow formula is selected for a particular production run, the controller 74 uses the actual mass flow(s) of the components of the source paint and/or the total mass flow of the source paint to calculate what the mass flows of the colorants should be to maintain the relative proportions of the colorants and the other components based on the selected mass flow formula. Initially, the colorants are supplied to the main mixing pipe 70 in accordance with these calculated mass flows. The color measurement system 72, however, monitors the color of the chromatic paint being manufactured and determines whether it is within a certain color tolerance value of the color standard for the mass flow formula. If the color of the chromatic fluid being produced is not within the certain color tolerance value, a color matching software program in a computer 308 of the color measurement system 72 transmits control signals to the controller 74, instructing the controller 74 to vary the amounts of the colorants being added.

Referring now to FIG. 2, the color measurement system 72 generally comprises a sample line 300, a sample pump 302, a fluid inspection cell 304, a spectrophotometer 306 and the computer 308.

The sample line 300 of the color measurement system 72 is connected to the main mixing pipe 70 between the mass flow meter 252 and the holding tanks 76. More specifically, an inlet of the sample line 300 is connected to the main mixing pipe 70 at the first sample connection 114, while an outlet of the sample line 300 is connected to the main mixing pipe 70 at a second sample connection 116. The sample pump 302 and the fluid inspection cell 304 are connected into the sample line 300. The sample pump 302 is electrically connected to the controller 74 by wiring 78. The sample pump 302 can be a progressing cavity pump operable to pump fluid through the fluid inspection cell 304 in a constant, uniform, non-pulsating flow. An example of a commercially available progressing cavity pump that may be used is the Group D dosing pump available from Seepex, Inc. Between the outlet of the sample pump 302 and the fluid inspection cell 304, a mass flow meter 310 is connected into the sample line 300 to provide a measure of the flow of fluid into the fluid inspection cell 304. The mass flow meter 310 is electrically connected to the controller 74 by wiring 80. In response to the signal from the mass flow meter 310, the controller 74 controls the pump 302 in a manner to maintain a substantially constant flow rate of fluid into the fluid inspection cell 304.

Figure 3:
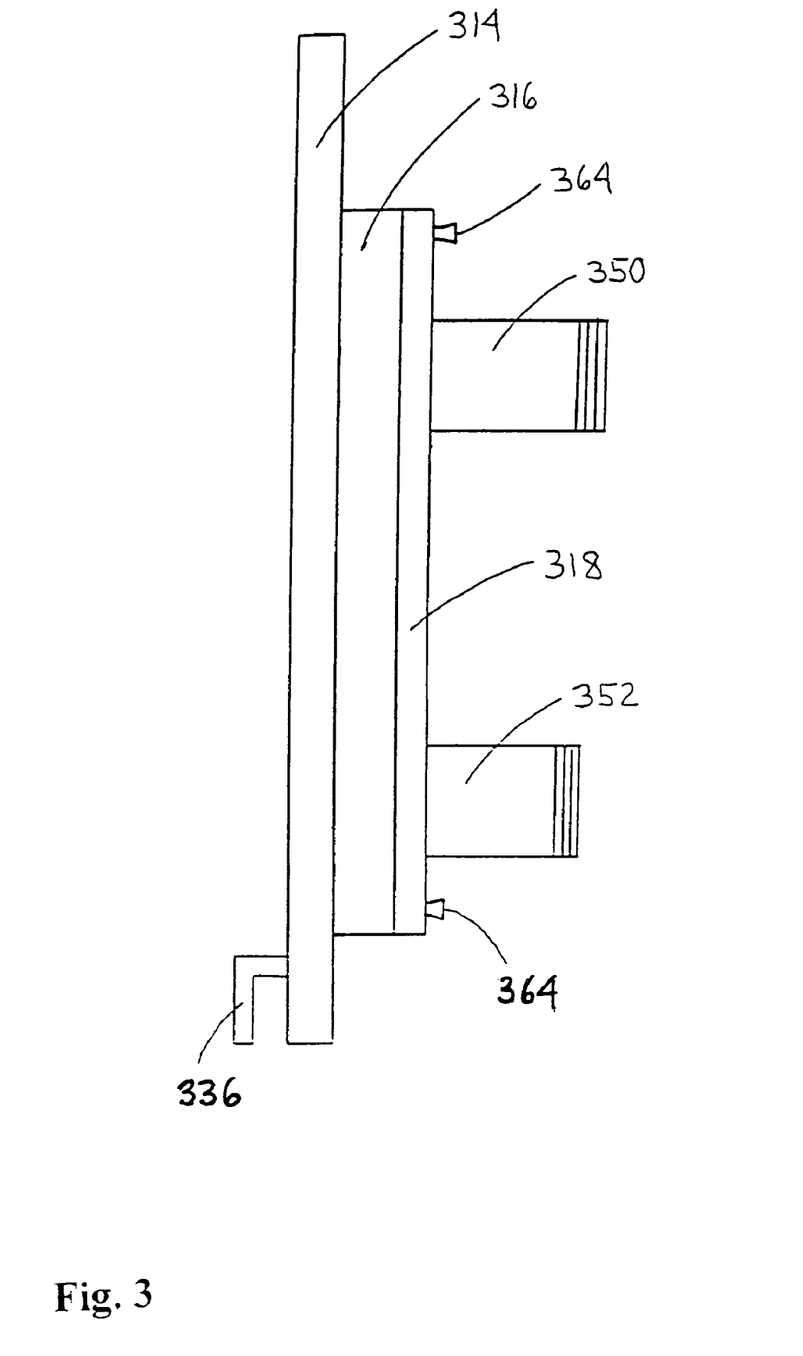
FIG. 3 shows a side view of a fluid inspection cell of the color measurement system.

Referring now to FIG. 3, the fluid inspection cell 304 generally includes a front plate 314, a middle housing 316, and a rear plate 318. For example, the front plate 314, the middle housing 316 and the rear plate 318 can be composed of a strong, rigid material, such as steel.

Figure 4:
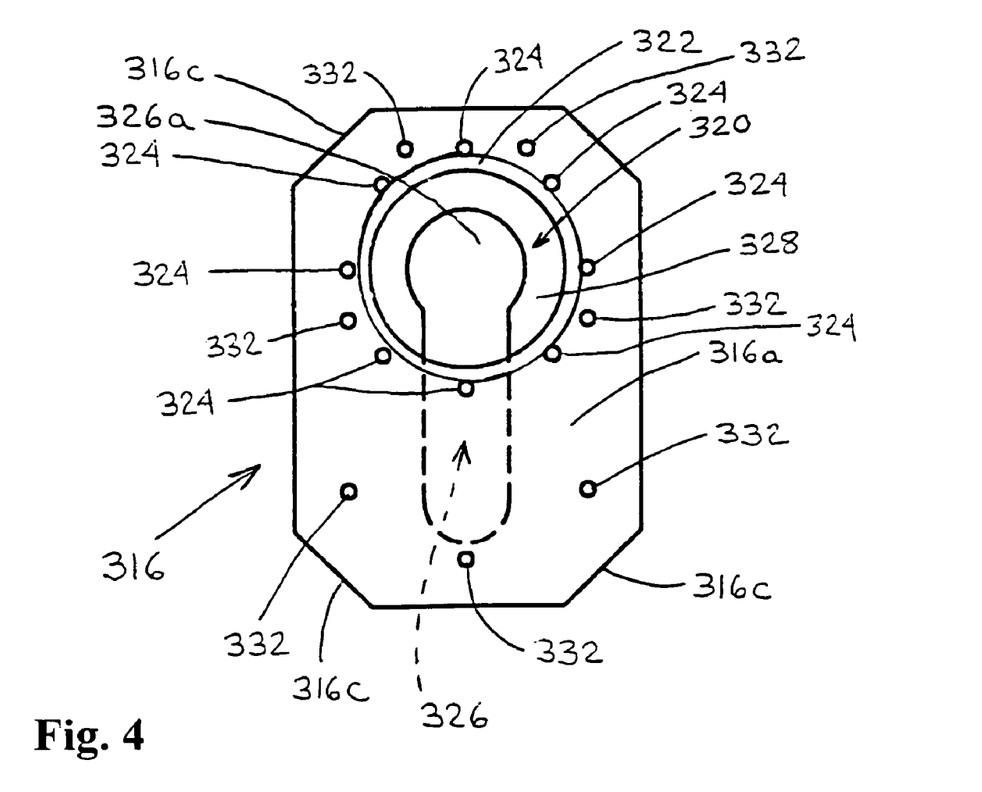
FIG. 4 shows a front view of a middle housing of the fluid inspection cell.
Figure 5:
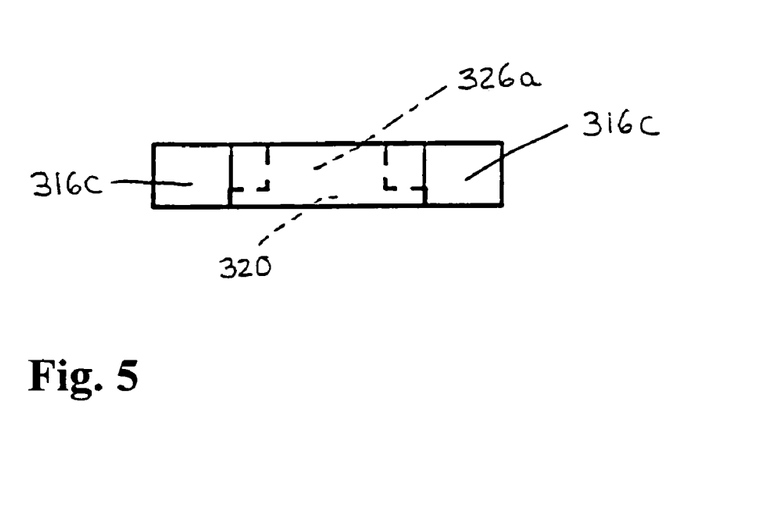
FIG. 5 shows a top view of the middle housing.
Figure 6:
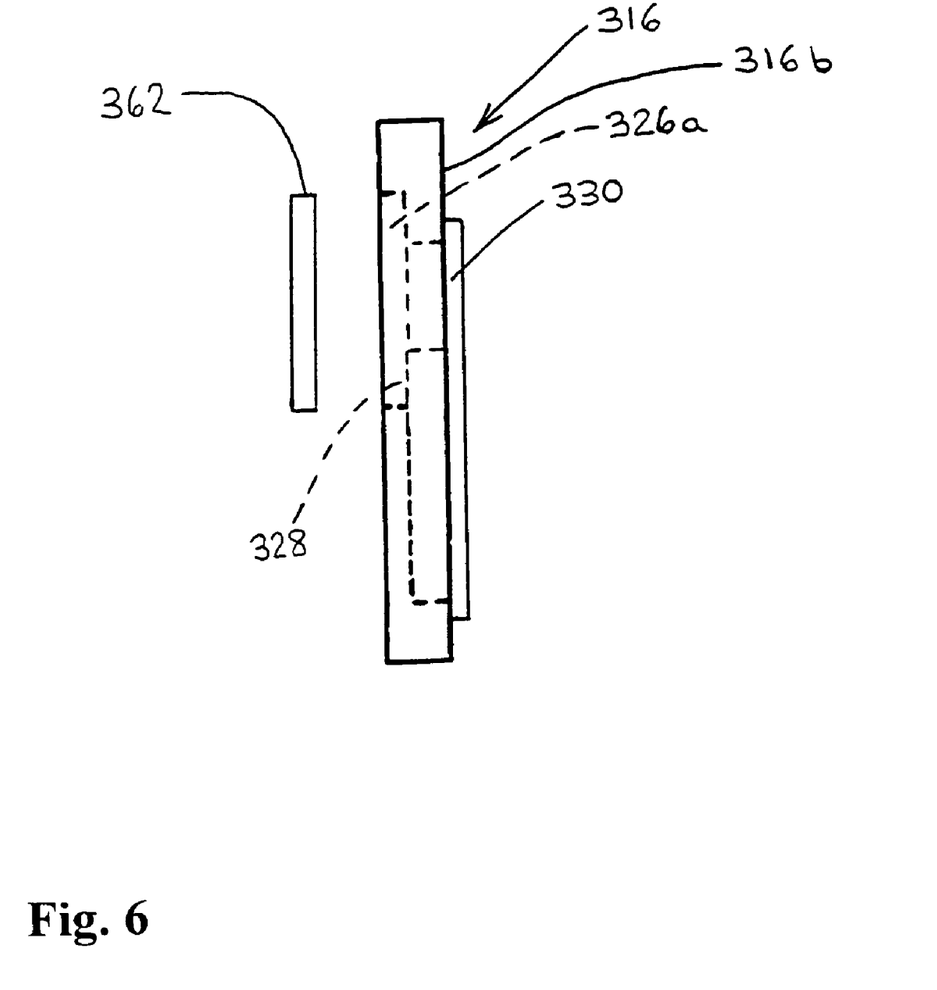
FIG. 6 shows a side view of the middle housing with a lens spaced therefrom.

Referring now to FIGS. 4-6, the middle housing 316 has planar first and second surfaces 316a,b and a plurality of side surfaces 316c defining a generally octagonal perimeter. A circular recess 320 is formed in the first surface 316a, toward a top end of the middle housing 316. An annular gasket 322 is disposed around the recess 320, on the first surface 316a. A plurality of threaded openings 324 are formed in the first surface 316a and are disposed around the gasket 322. A generally key-shaped groove 326 is formed in the second surface of the middle housing 316. An upper end portion 326a of the groove extends into the recess 320 to form a passage through the middle housing 316. The upper end portion 326a of the groove 326 has a width smaller than the diameter of the recess 320. In this manner, an interior surface of the recess 320 forms an annular ledge or shelf 328 around the end portion 326a. A key-shaped gasket 330 is disposed around the groove 326, on the second surface 316b of the middle housing 316. A plurality of mounting passages 332 are disposed around the key-shaped gasket 330 and extend through the middle housing 316.

Figures 7, 8:
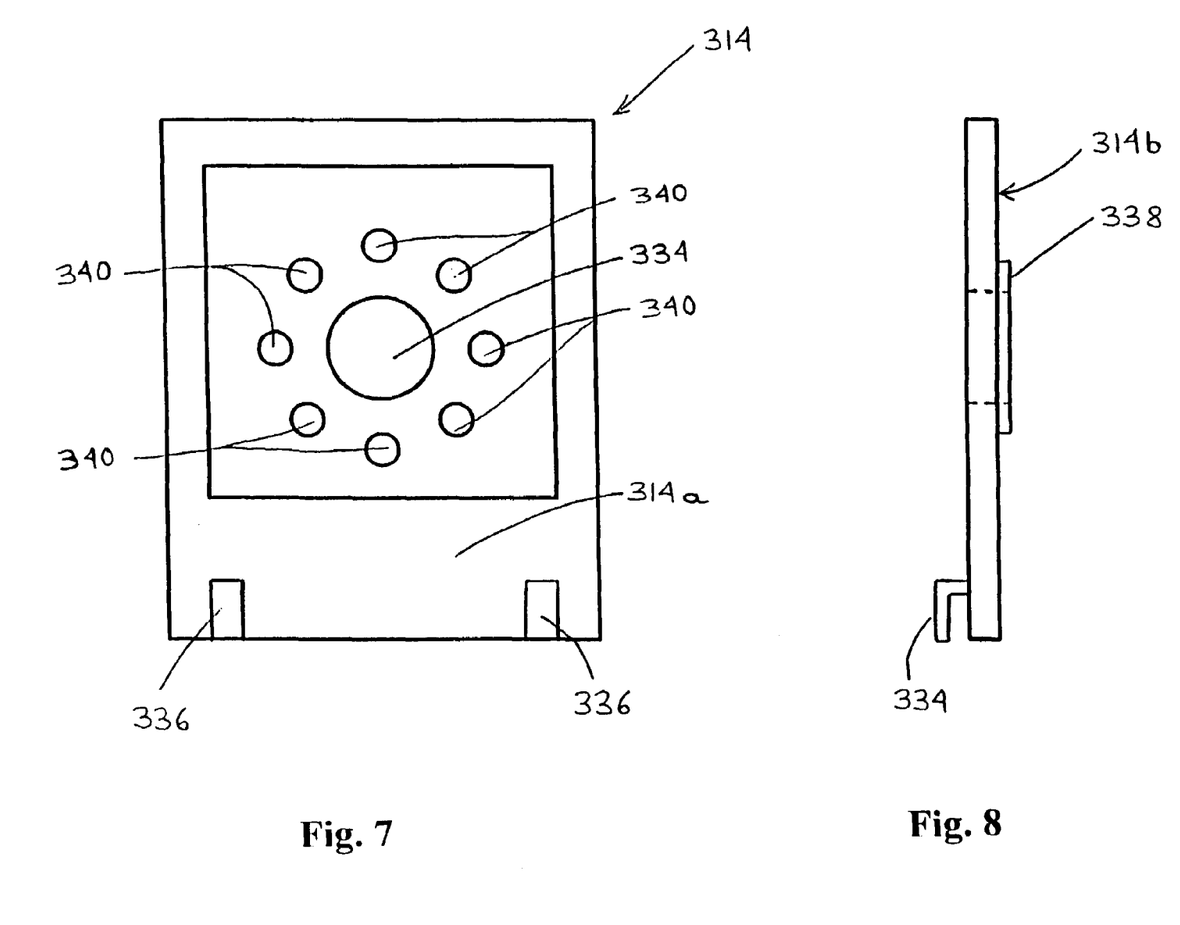
FIG. 7 shows a front view of a front plate of the fluid inspection cell.
FIG. 8 shows a side view of the front plate.

Referring now to FIGS. 7 and 8, the front plate 314 is generally rectangular in shape and has planar first and second surfaces 314a,b. A circular opening 334 is formed in the front plate 314, toward a top end thereof Hook-shaped mounts 336 may be joined to the first surface 314a of the front plate 314, toward a bottom end thereof An annular gasket 338 is disposed around the circular opening 334, on the second surface 314b of the front plate 314. A plurality of mounting holes 340 are disposed around the gasket 338 and extend through the front plate 314. The mounting holes 340 are positioned so as to be in alignment with the threaded openings 324 in the middle housing 316 when the front plate is 314 aligned over the middle housing 316. A plurality of threaded openings (not shown) are formed in the second surface 314b of the front plate 314 and are positioned so as to be in alignment with the mounting passages 332 in the middle housing 316 when the front plate 314 is aligned over the middle housing 316.

Figure 9:
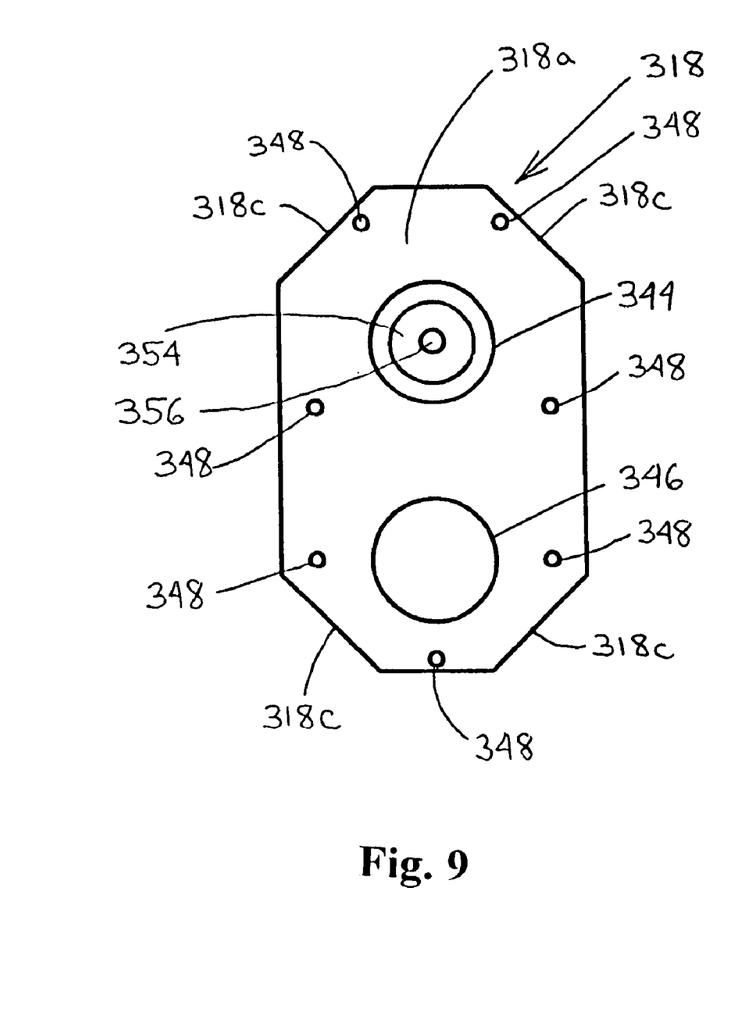
FIG. 9 shows a front view of a rear plate of the fluid inspection cell.
Figure 10:
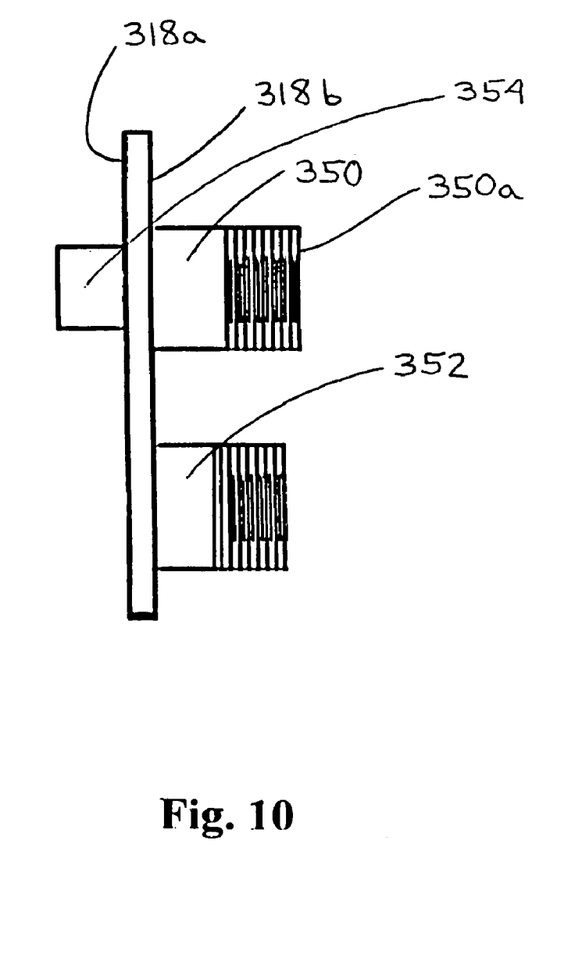
FIG. 10 shows a side view of the rear plate.

Referring now to FIGS. 9 and 10, the rear plate 318 has planar first and second surfaces 318a, 318b and a plurality of side edges 318c defining a generally octagonal perimeter. Circular inlet and outlet openings 344, 346 are formed in the rear plate 318, toward a top end and a bottom end of the rear plate 318, respectively. A plurality of mounting passages 348 are formed in the rear plate 318, around the perimeter thereof The mounting passages 348 in the rear plate 318 are positioned so as to be in alignment with the mounting passages 332 in the middle housing 316 when the middle housing 316 is aligned over the rear plate 318.

Tubular inlet and outlet flow connectors 350, 352 are respectively secured within the inlet and outlet openings 344, 346 of the rear plate 318. The inlet and outlet flow connectors 350, 352 have an interior diameter of about 1 inch. The inlet flow connector 350 extends rearwardly from the rear plate 318, with an inner end of the inlet flow connector 350 being secured within the inlet opening 344 and an outer end 350a of the outlet flow connector 350 being spaced from the second surface 318b of the rear plate 318. The outlet flow connector 352 extends rearwardly from the rear plate 318, with an inner end of the outlet flow connector 352 being secured within the outlet opening 346 and an outer end 352a of the outlet flow connector 352 being spaced from the second surface 318b of the rear plate 318. The outer ends 350a, 352a of the inlet and outlet flow connectors 350, 352, respectively, are threaded for connection to inlet and outlet portions of the sample line 300, respectively. A constriction insert 354 is secured within the inlet flow connector 350, at the inner end thereof, and extends forwardly from the rear plate 318. The constriction insert 354 has a restricted opening 356 of about 0.25 inches. The restricted opening 356 increases the velocity of the fluid flowing into the fluid inspection cell 304 to ensure that the flow of fluid is turbulent, which typically corresponds to a Reynold's Number above 3000.

A planar lens 362 (shown in FIG. 6) having a circular shape and a smooth finish is provided for disposal in the recess 320 of the middle housing 316. The lens 362 has a diameter greater than the passage through the middle housing and, thus, has a peripheral portion that is supported by the shelf 328 when the lens 362 is disposed in the recess 320. The lens 362 is transparent and is composed of a material that can have a hardnessgreater than 7 mohs. For example, the lens 362 can be composed of sapphire.

Referring back to FIG. 3, when the fluid inspection cell 304 is assembled, the middle housing 316 is secured between the front and rear plates 314, 318 by a plurality of threaded bolts 364 that extend through the mounting passages 348 in the rear plate 318 and the mounting passages 332 in the middle housing 316, and have free ends threadably secured in the threaded openings in the second surface 314b of the front plate 314. The second surface 318b of the rear plate 318 covers the groove 326 in the middle housing 316, thereby forming an interior conduit through which chromatic fluid or other fluid may travel through the fluid inspection cell 304. The interior conduit is connected between, and disposed substantially perpendicular to, the inlet and outlet flow connectors 350, 352. In this manner, the interior conduit and the inlet and outlet flow connectors 350, 352 form a generally U-shaped flow path through the fluid inspection cell 304.

The lens 362 is disposed in the recess 320 of the middle housing 316, with the peripheral portion of the lens 362 being trapped between the shelf 328 of the middle housing 316 and the annular gasket 338 disposed around the circular opening 334, on the second surface 314b of the front plate 314. With the lens 362 so positioned, the plane of the lens 362 is disposed perpendicular to the flow of chromatic fluid entering the fluid inspection cell 304 and at a first bend in the flow path through the fluid inspection cell 304. A plurality of screws (not shown) extend through the mounting holes 340 in the front plate 314 and are threadably received in the threaded openings 324 in the middle housing 316, thereby helping secure the front plate 314 to the middle housing 316. With the front plate 314 secured to the middle housing 316 in the foregoing manner and the lens 362 secured therebetween, the lens 362 is firmly secured from movement.

Referring back to FIG. 2, chromatic fluid from the main mixing pipe 70 is pumped through the sample line 300 by the pump 302 and enters the fluid inspection cell 304 through the inlet connector 350. The fluid passes through the inlet flow connector 350 and the constriction insert 354 and impinges against the lens 362. The fluid then flows through the interior conduit and exits the fluid inspection cell 304 through the outlet flow connector 352. After flowing through the fluid inspection cell 304, the fluid flows back to the main mixing pipe 70 through the outlet of the sample line 300. As set forth above, the flow of the fluid through the fluid inspection cell 304 is turbulent.

The spectrophotometer 306 is mounted adjacent to the fluid inspection cell 304 such that its sample port is spaced a fixed distance of about 5 inches from the lens 362 of the fluid inspection cell 304. The spectrophotometer is operable to measure the color of the fluid flowing through the fluid inspection cell 304. More specifically, the spectrophotometer 306 is for measuring the tristimulus values X, Y and Z of the fluid. The spectrophotometer 306 may be any commercially available model that can continuously measure the tristimulus values X, Y and Z of the fluid and generate a continuous digital signal representative thereof. The spectrophotometer 306 can be of the dual-beam type, wherein the spectrophotometer 306 has a light source that is split into a sample beam and a reference beam, with the reference beam being used to correct for variations in the intensity of the light source. An example of such a dual beam spectrophotometer is the SpectraProbe XE available from HunterLab Associates, Inc.

Conventionally, a dual beam spectrophotometer includes the light source, a light analyzer, optics for conducting the sample beam to the fluid inspection cell, optics for collecting light reflected from the fluid inspection cell, optics for conducting the reference beam to the light analyzer, and a data processor. The light analyzer receives both the reference beam and the light reflected from the fluid inspection cell. The light analyzer includes a device for separating light into its component wavelengths, such as a diffraction grading or a prism, and an array of detectors to measure the intensities of the different wavelengths. Signals from the detector array are multiplexed and fed to the data processor, which produces a digital signal representative of the tristimulus values X, Y and Z. The spectrophotometer 306 is connected to the computer 308 by wiring 366 over which the digital signal is transmitted.

The spectrophotometer 306 calculates the X, Y and Z values of the fluid flowing through the fluid inspection cell 304 from the fluid's spectral curve, which is a plot of reflectance vs. wavelength. The spectrophotometer 306 determines the spectral curve of the fluid through the visible light spectrum of 400-700 nanometers (nm), typically at 20 nm increments, and calculates the X, Y and Z values for the fluid based on this data according to the formulas:

$$X = \sum_\lambda ER_X$$

$$Y = \sum_\lambda ER_y$$

$$Z = \sum_\lambda ER_Z$$

where E is the relative energy of a standard light source, R is the average reflectance of the target object and x, y, z are the color mixture functions for a specified observer.

The software program in the computer 308 receives the measured X, Y and Z values of the chromatic fluid flowing through the fluid inspection cell 304 from the spectrophotometer 306 and uses them to control the color of the chromatic fluid being produced. More specifically, the computer 308 compares the measured X, Y and Z values of the chromatic fluid being produced to the X, Y and Z values of the color standard for the selected mass flow formula and determines whether the difference is within the certain color tolerance value as determined by $\Delta E$. If the difference is not within the certain color tolerance value, the computer 308 calculates the changes in the flow rates of the colorants needed to bring the fluid within the color tolerance of the selected mass flow formula.

The changes in flow rates of colorants required to shade the chromatic fluid being manufactured from its measured X, Y and Z color readings to a color falling within the certain color tolerance value can be determined based on historical data of previous runs or can be determined by a series of mathematical calculations. If the changes are determined based on historical calculations, the measured tristimulus values are compared to a previous production run involving similar measured tristimulus values. By this method, a proportional change in flow rate of a colorant being added to the fluid is made based upon the historically required change in flow rate of the colorant necessary to adjust from one set of tristimulus values to another.

The mathematical procedure utilized to calculate the changes in flow rates of the colorants based upon differences in X, Y and Z readings is based upon well known mathematical procedures that are used to calculate the addition of set amounts of colorants based on differences in X, Y and Z readings for batch systems. One such well known procedure is that described in Eugene Allen's article in the Journal of the Optical Society of America, Volume 64, Number 7, July 1974 pages 991 to 993 (the "Eugene Allen Article"), the teaching of which is hereby incorporated by reference. A procedure based on the Eugene Allen procedure is disclosed in U.S. Pat. No. 4,887,217 to Sherman et al., which is assigned to the assignee of the present invention and is hereby incorporated by reference. In the present invention, the Eugene Allen procedure is modified to use mass flows of the colorants (and other components) instead of set amounts of the colorants and other components. For colorants having given concentrations, absorption coefficients and scattering coefficients, the modified Eugene Allen procedure provides a determination of the changes in the flow rates of the colorants that are required to adjust the X, Y, Z readings from one value to another. Since the chromatic fluid is flowing and a given portion of the chromatic fluid is tinted or shaded with colorants only once, the tinting or shading of the chromatic fluid is not a strictly additive procedure as in a batch process, i.e., the amount of a particular colorant can be reduced and not just increased.

In an example of this procedure, a mathematical technique is first applied to the chromatic fluid being produced to determine, by an iterative process, the flow rates of colorants theoretically required to essentially match the x, Y and Z values for the color standard for the selected mass flow formula. In a second step the mathematical technique is again applied in an iterative process to determine the changes in flow rates of the colorants necessary to move from the measured color of the chromatic fluid being produced to the standard for the selected mass flow formula. The endpoint determination of each of the iterative steps is related to the difference between the measured values of X, Y and Z and the X, Y and Z values of the color standard of the selected mass flow formula.

The mathematical equations for this type of calculation (assuming four colorants charged into the fluid being produced and subsequently shading with three of those colorants) are described in the Eugene Allen Article.

Once the computer 308 determines the changes in the flow rates of the colorants that are required to bring the color of the chromatic fluid being manufactured within the color tolerance value, the computer 308 provides these changes to the controller 74, which generates control signals in response thereto. These control signals are transmitted to the progressing cavity pumps 180-186 and instruct the progressing cavity pumps 180-186 to change the flow rates of the colorants in accordance with the changes calculated by the computer 308.

Optionally, the fluid can also be circulated through a valve 270 to a recycle loop 260 back to the main mixing pipe 70. The optional recycle loop provides the ability to recycle the fluid for any further treatment, such as additional mixing, shading, or additives prior to the fluid being pumped to the holding tanks 76. The recycle loop 260 includes a surge tank 280 in which the fluid can be further agitated and accumulated prior to re-entering the process stream. Once the fluid is pumped into the holding tanks 76, valve arrangements 270 and 271 are closed, thereby allowing the fluid to bypass the recycle loop 260. The time and amount of recycling depends upon how quickly any additional desired properties are achieved.

The color adjustment system 10 of the present invention provides a number of benefits. The color adjustment system 10 can be used to shade or tint a flow of paint from a continuous paint production unit, such as the one disclosed in U.S. Pat. No. 6,010,032 to Vermylen et al. The color adjustment system can also be used to shade or tint a flow of paint from one or more batch mixing vessels. For example, it may be desirable to form a large batch of water-borne paint in a large mixing vessel, wherein the paint contains opacifying and extender pigments, but does not contain any chromatic pigments. A first portion of the batch may be discharged into the color adjustment system 10 and tinted to have a first chromatic color. This first portion of the batch is then stored in a first one of the holding tanks 76. The main mixing pipe 70 is rinsed with water to remove any residual paint with the first chromatic color. A second portion of the batch may then be discharged into the color adjustment system 10 and tinted to have a second chromatic color. This second portion of the batch is then stored in a second one of the holding tanks 76. In this manner, the color adjustment system 10 may be used to produce two quantities of different colored paints from one main batch of paint, thereby eliminating the need to use two mixing vessels to produce the two quantities of different colored paints or to clean the mixing vessel between the production of the two quantities of different colored paints.

While the invention has been shown and described with respect to particular embodiments thereof, those embodiments are for the purpose of illustration rather than limitation, and other variations and modifications of the specific embodiments herein described will be apparent to those skilled in the art, all within the intended spirit and scope of the invention. Accordingly, the invention is not to be limited in scope and effect to the specific embodiments herein described, nor in any other way that is inconsistent with the extent to which the progress in the art has been advanced by the invention.

What is claimed is:

1. A color adjustment system for changing the color of fluid flowing from a source, said color adjustment system comprising:

a plurality of storage vessels for holding compositions to be added to the fluid, said compositions comprising at least one colorant;

a main mixing pipe having an inlet portion and an outlet portion, said inlet portion being provided for connection to the source to receive a flow of the fluid therefrom, said inlet portion having a plurality of inlets connected to the storage vessels to continuously receive flows of the compositions from the storage vessels, said flows of the compositions being mixed together in the main mixing pipe to form a continuous flow of different colored fluid out of the outlet of the mixing pipe;

a fluid inspection cell connected to the outlet portion of the main mixing pipe for continuously receiving a sample portion of the flow of the different colored fluid, said fluid inspection cell including an interior flow path through which the sample portion may flow and a viewing window through which the sample portion may be viewed as it flows through the flow path;

a sample pump connected between the outlet portion of the main mixing pipe and the fluid inspection cell, said sample pump being operable to pump the sample portion of the different colored fluid through the fluid inspection cell at a substantially constant pressure and at a turbulent flow;

a spectrophotometer positioned to view the sample portion of the flow of the different colored fluid through the window of the fluid inspection cell, said spectrophotometer being operable to measure color values of the sample portion and to generate at least one electrical signal representative thereof;

a control unit electrically connected to the spectrophotometer to receive the at least one electrical signal generated by the spectrophotometer, said control unit being operable to perform a comparison of the measured color values to desired color values and to produce at least one electrical control signal dependent on the comparison;

at least one colorant pump electrically connected to the control unit to receive the at least one electrical control signal, said at least one colorant pump being connected to at least one of the storage vessels and being operable to pump the at least one colorant to the main mixing pipe in response to the at least one electrical control signal.

2. The color adjustment system of claim 1, wherein the viewing window comprises a sapphire lens.

3. The color adjustment system of claim 2, wherein the plane of the lens is disposed perpendicular to the flow of fluid entering the fluid inspection cell.

4. The color adjustment system of claim 3, wherein the flow path of the fluid inspection cell is generally U-shaped.

5. The color adjustment system of claim 1, wherein the inlets are staggered along the axis of the main mixing pipe so as to obtain sequenced mixing of the components as the components flow through the main mixing pipe.

6. The color adjustment system of claim 5, wherein the at least one colorant comprises a plurality of colorants, and wherein the at least one colorant pump comprises a plurality of colorant pumps, each of said colorant pumps being dedicated to pumping one of the colorants into the main mixing pipe.

7. The color adjustment system of claim 1, further comprising a recycle loop attached to the main mixing pipe, in which the fluid is recirculated back to the source for further treatment.

* * * * *